Patented June 13, 1950

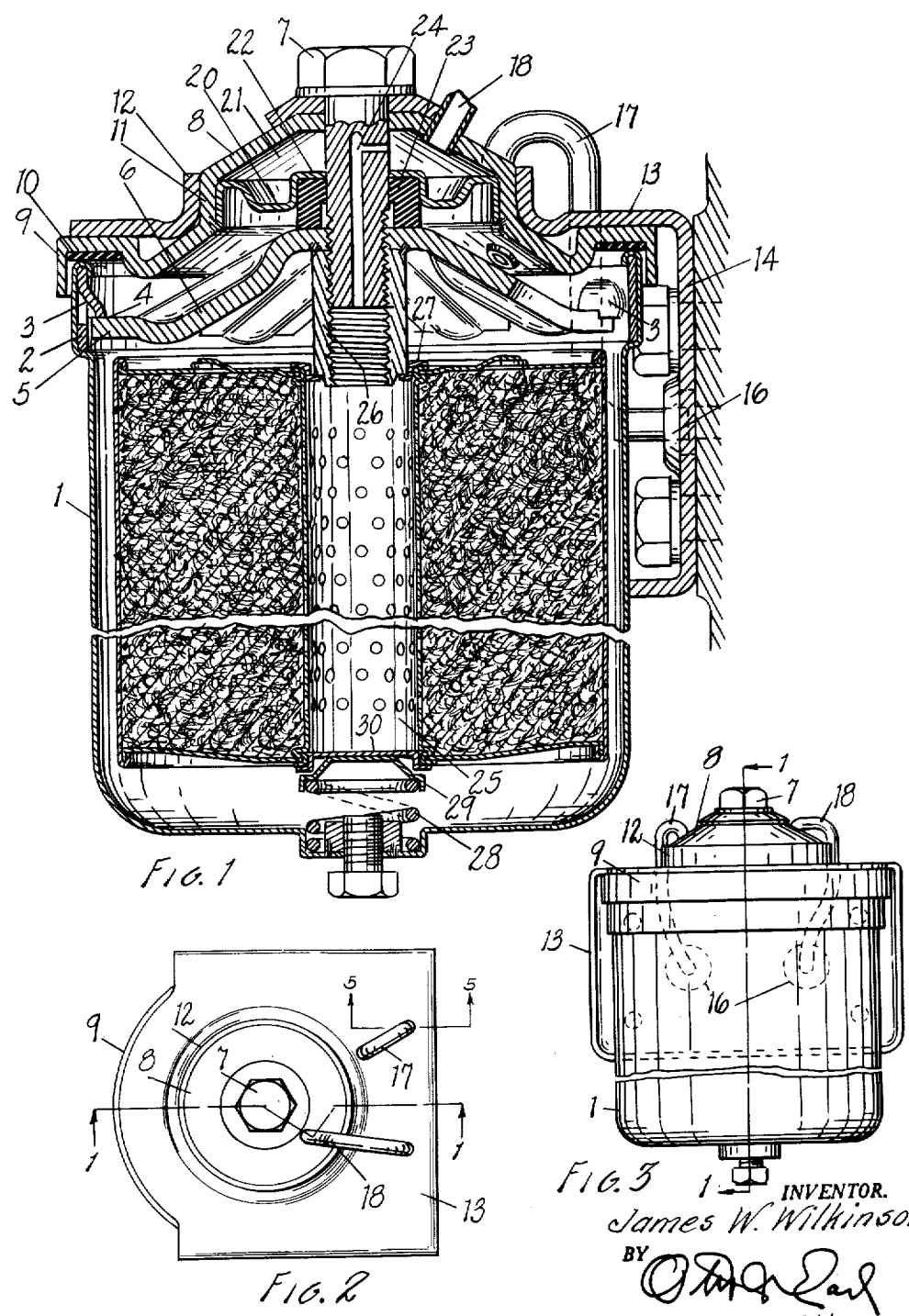

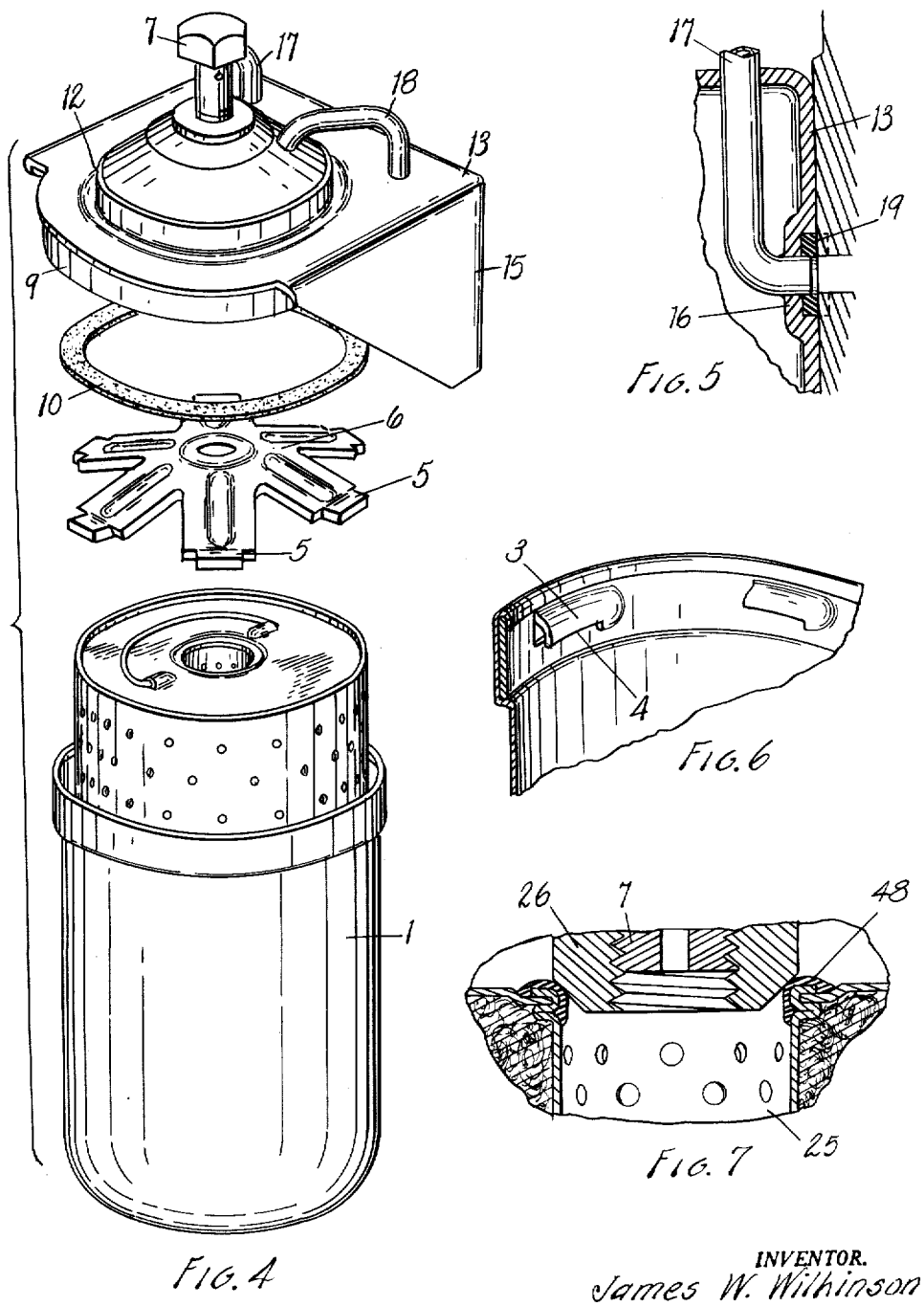

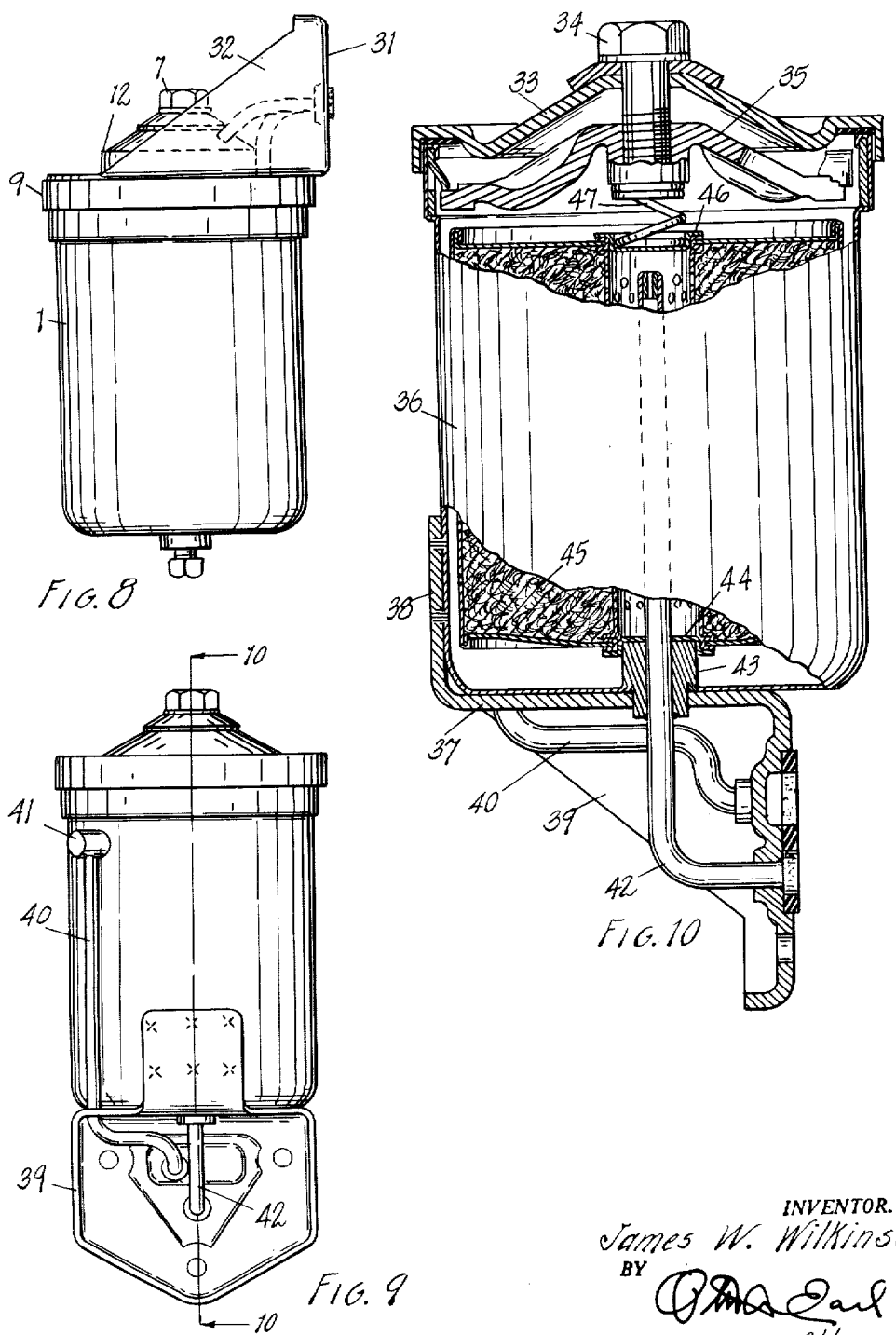

2,511,800

UNITED STATES PATENT OFFICE 2,511,800

OIL FILTER

James W. Wilkinson, Hastings, Mich., assignor to Hastings Manufacturing Company, Hastings, Mich., a corporation of Michigan Application July 26, 1946, Serial No. 686,546

10 Claims. (Cl. 210—183)

This invention relates to improvements in oil filters.

The main objects of this invention are:

First, to provide an oil filter which may be mounted on an engine in proper relation to and connections with the oil conduits of the engine, and so mounted as to permit the removal of the filtering medium without disturbing the oil circulating connections.

Second, to provide novel means for securing the container of a filter to the rest of the filter so that no stresses incurred in sealing the container to the rest of the filter will be transmitted to the body of the container.

Third, to provide a novel means for mounting an oil filter on the block of an engine which avoids the necessity of accurately machined and expensively finished parts and a mounting in which none of the stresses incurred in mounting are transmitted to the container.

Fourth, to provide a novel and effective seal between the inlet and outlet chamber of an oil filter which will be effective with lower clamping pressures than have been used heretofore.

Fifth, to provide a novel connection between the removable container of an oil filter and the fixed cover which may be easily and securely fastened without danger of damaging the container.

Sixth, to provide a filter of the character described which permits ready removal of the container and the enclosed filter element and the replacement thereof, minimizing labor and also the spilling of oil.

The drawings, of which there are three sheets, illustrate a preferred form of the invention and two modified methods of mounting the oil filter and one modified type of seal between the filter cartridge and the body of the filter.

Fig. 1 represents a vertical cross-sectional view through an oil filter as attached to an engine.

Fig. 2 represents a plan view of the filter.

Fig. 3 represents a front view of the filter.

Fig. 4 represents an exploded perspective view of the filter.

Fig. 5 represents a fragmentary cross-sectional view taken along the line 5—5 of Fig. 2.

Fig. 6 represents an enlarged perspective view of the top portion of the filter container.

Fig. 7 represents an enlarged cross-sectional view showing a modified form of a seal between the filter cartridge and the outlet from the filter.

Fig. 8 represents a side elevational view showing a first modified form of mounting bracket.

Fig. 9 represents a front elevational view of a second modified form of mounting bracket.

Fig. 10 represents a cross-sectional view taken along the line 10—10 in Fig. 9.

It is the general practice to provide filters for the lubricating oil of automobile engines which have a container for a removable filter cartridge together with a cover for the container and a bracket for mounting the filter to the engine block. In filters of this type a fairly rigid connection must be made to support the weight of the filter on the block and tight seals must be provided between the removable container and its cover and between the parts of the filter separating the inlet and outlet passages.

With reference to the drawings, I have shown an oil filter having a relatively thin walled cylindrical container 1, the open end of which is pressed outwardly to receive an annular mounting ring 2. The ring is pressed inwardly and slotted at regular intervals as at 3 to form bayonet slots with downwardly facing retaining edges 4. The retaining edges are arranged to rest on the ends of the arms 5 which extend downwardly and outwardly from the center of a spider member 6. The spider is threadedly connected at its center to a bolt 7 which extends downwardly through the center of the cover 8. The edges of the cover are formed with the annular flange 9 against which the open edge of the container 1 is arranged to be drawn by tightening the bolt 7. A gasket of oil resistant compressible synthetic rubber such as neoprene is positioned between the cover and the container.

The cover 8 is cup-shaped and has an intermediate cylindrical portion 11 around which is positioned the cylindrical flange 12 formed in the top plate of a mounting bracket 13. It is intended that the cover 8 shall be welded to the top plate of the mounting bracket along the cylindrical flange 11 and annular flange 9. The bracket 13 is provided with a vertical back plate 14 and triangular side plates 15. The back plate 14 is apertured to pass bolts for securing the bracket to the side of a motor block.

The back plate is further pressed out away from the motor block as at 16, as is most clearly illustrated in Figs. 3 and 5. The pressed out portions 16 are apertured to receive the ends of an inlet pipe 17 and an outlet pipe 18. The cavities formed by the pressed out portion around the ends of the pipes are filled with gaskets 19 formed of an oil resistant synthetic compressible material such as the commercial product "neoprene." The gaskets 19 in their free, uncompressed portion extend beyond the inner edge of the mounting bracket and will be compressed tightly against the motor block and around the ends of the inlet and outlet pipes when the bracket is secured to the block. The use of confined compressible gaskets eliminates the necessity of accurately finishing a part on the motor block and providing a rigid, accurately fitting mounting bracket, since the compression of the gasket will compensate for small inaccuracies in machining or distortion in the mounting brackets.

Positioned within the cover 8 and secured as by welding to the flange 11 is a partition plate 20 which forms an upper compartment 21 within the cover. The plate 20 is pressed to form a downwardly opening cup shaped seat 22, the center of which is apertured to pass the shank of the bolt 7. A cup shaped gasket 23 formed of the same compressible synthetic material as the gasket 19 is positioned around the bolt 7 in the seat 22. As the spider 6 is drawn upwardly by tightening the bolt 7, the seal 23 is squeezed tightly into the seat and around the bolt 7, effectively sealing the opening from the upper chamber 21.

The oil outlet pipe 18 communicates with the upper chamber 21 and from there through a passage 24 formed in the bolt 7 to the center of a filter cartridge 25 mounted in the container. An internally threaded boss 26 is securely fastened to the under side of the spider 6 and receives the shank of the bolt 7. The lower end of the boss 26 is shouldered to fit against a metal seal 27 carried at the top of the filter cartridge 25.

The oil inlet pipe 17 communicates through the cover 8 below the partition 20 so that oil entering through this pipe may flow between the arms of the spider into the body of the container 1 and around the filter cartridge 25. The cartridge is held against the lower end of the boss 26 by a coil spring 28 and a button 29 which press upwardly against a sealing cap 30 positioned at the bottom of the filter cartridge. Oil will then pass through the apertures in the outer walls of the cartridge, through the filtering material to the center of the cartridge and out through the outlet passage 24 in the bolt 7. It is contemplated that the cartridge used in the filter will be that more particularly described and claimed in my copending application, Serial No. 686,547, filed July 26, 1946.

From the above construction it will be noted that the stress required to clamp the container to the cover and against the gasket 10 is entirely carried by the cylindrical ring 2 and the spider 6 so that the container 1 may be made as a light stamping with sufficient strength to resist only the pressure of the oil in the lubricating system. The mounting bracket 13 and the cover may be fashioned as stampings from heavier gauge metal to support the weight of the filter, but due to the use of the compressible seals 19 these parts need not be of too rigid character.

In the modified form of the invention illustrated in Fig. 8 all the parts of the filter are the same as those which have just been described except that the mounting bracket 13 has its back wall 31 and side walls 32 turned upwardly so that the container hangs entirely below the connection to the engine block.

In the modified form of the invention shown in Figs. 9 and 10 the cover 33 is not provided with a partition plate or seal as in the preferred form of the inevntion and the bolt 34 connects directly to the spider 35. The body 36 of the container is secured as by welding to the horizontal plate 37 and vertical ear 38 of the bracket 39 which in this case is mounted below the body of the filter. The oil inlet pipe 40 extends upwardly and enters the body of the container as at 41 near the top thereof while the oil outlet pipe 42 extends upwardly through a boss 43 formed on the bottom of the container 36. The boss 43 forms a seat for the seal 44 at the bottom of the filtering cartridge 45. The top of the cartridge is sealed by a plug 46 held in place by the coil spring 47 secured around the under side of the spider 35.

In this form of the invention the container for the filter cartridge remains permanently fixed to the mounting bracket and the cover 33 is removed by loosening the bolt 34 and turning the spider 35 when it is desired to remove the filter cartridge. The stress of clamping the cover to the container is still carried by the spider and cylindrical ring in the top of the container and the weight of the filter is adequately distributed and supported by the mounting bracket across the bottom of the container.

The various seals between the ends of the filter cartridge may be conveniently formed as described in my above mentioned copending application and as shown in Fig. 7 in which an annular ring 48 of compressible synthetic material is painted or sprayed around the edges of the central tube of the filter cartridge.

The integral connection of the cover and bracket with the circulation conduits entirely carried thereby enables quick manipulation for the replacement of a filtering cartridge, and this may be done without spilling of oil on the floor as is likely to occur with certain types of filters now quite extensively used, but which either necessitate the disconnecting of the oil circulating conduits or the removal of the filter from the container while the container is still attached to the engine.

The invention has been illustrated and described in embodiments which have been found highly satisfactory. No attempt has been made to illustrate or describe other embodiments or adaptations which might be practical, as it is believed this disclosure will suggest and teach the modification of the invention as may be desired.

Having thus described the invention what is claimed as new and desired to secure by Letters Patent is:

1. A filter comprising a cylindrical container member of relatively light gauge material, a cover member of relatively heavy gauge material, a stamped angle shaped bracket having one of its arms arranged to be connected to an engine block and its other arm secured to one of said members, said one arm forming a pair of ports arranged to register with oil holes in said engine block, said one arm being outwardly embossed adjacent said ports to form a recess therearound, a reinforcing ring mounted along the top of said container member, a spider having arms engageable with said ring, screw means connected to said cover member and engageable with said spider for drawing said ring and said container member against said cover, a filter cartridge positioned within said container member, inlet and outlet pipe means extending from said ports in said one arm through said other arm and connected to ports in one of said members opening within said container member, and a compressible oil resistant gasket positioned in said recess and around one of said ports in said first arm, said gasket extending beyond the face of said arm in the uncompressed state of said gasket and being compressible into said recess between said block and arm to form a seal around the ports in said block and said one arm.

2. An oil filter comprising a relatively light gauge cylindrical container, a reinforcing ring defining slots therearound secured to the top of said container, a spider member having arms arranged to engage said slots, a central boss on said spider member defining an internally threaded aperture, a relatively heavy cup-shaped cover member having a rim engageable with said container, a partition plate mounted in said cover member and forming a compartment, a bolt extending through said cover member and said partition plate and engageable in said boss, said bolt defining a passage from said compartment through said boss, a filter cartridge positioned within said container and spring pressed against said boss, a rigid mounting bracket secured to said cover member, a flange on said bracket arranged to be secured to a motor block and defining inlet and outlet ports, and pipes extending from said ports through said cover on each side of said partition plate.

3. An oil filter comprising a relatively light gauge cylindrical container, a reinforcing ring defining slots therearound secured to the top of said container, a spider member having arms arranged to engage said slots, a central boss on said spider member defining an internally threaded aperture, a relatively heavy cup-shaped cover member having a rim engageable with said container, a partition plate mounted in said cover member and forming a compartment, a bolt extending through said cover member and said partition plate and engageable in said boss, said bolt defining a passage from said compartment through said boss, a filter cartridge positioned within said container and spring pressed against said boss, a rigid mounting bracket secured to said cover member, a flange on said bracket arranged to be secured to a motor block and defining inlet and outlet ports, pipes extending from said ports through said cover on each side of said partition plate, and an oil resistant compressible gasket positioned around said bolt and between said partition plate and said spider.

4. An oil filter comprising a relatively light gauge cylindrical container, a reinforcing ring defining slots therearound secured to the top of said container, a spider member having arms arranged to engage said slots, a central boss on said spider member defining an internally threaded aperture, a relatively heavy cup-shaped cover member having a rim engageable with said container, a partition plate mounted in said cover member and forming a compartment, a bolt extending through said cover member, said partition plate and engageable in said boss, said bolt defining a passage from said compartment through said boss, a filter cartridge positioned within said container and spring pressed against said boss, a rigid mounting bracket secured to said cover member, a flange on said bracket arranged to be secured to a motor block and defining inlet and outlet ports, pipes extending from said ports through said cover on each side of said partition plate, and gaskets of oil resistant compressible material positioned around said ports and extending beyond the face of said flange.

5. An oil filter comprising a relatively light gauge cylindrical container member, a reinforcing ring secured to the upper edge of said container member, a relatively rigid cover member, screw means extending through said cover member, a clamping member extending between said screw means and said reinforcing ring, a bracket secured to the bottom of said container member, an attaching flange formed on said bracket and defining a pair of ports, a boss formed on the bottom of said container member and defining a passage, an oil conduit extending from one of said ports through said passage into said container, a second oil conduit extending from the other of said ports into the side of said container, a renewable filter cartridge positioned in said container and around the end of said first mentioned conduit, and seal means extending between said clamping member and the top of said filter cartridge.

6. An oil filter comprising a relatively light gauge cylindrical container member, a reinforcing ring secured to the upper edge of said container member, a relatively rigid cover member, screw means extending through said cover member, a clamping member extending between said screw means and said reinforcing ring, a bracket secured to the bottom of said container member, an attaching flange formed on said bracket and defining a pair of ports, a boss formed on the bottom of said container member and defining a passage, an oil conduit extending from one of said ports through said passage into said container, a second oil conduit extending from the other of said ports into the side of said container, a renewable filter cartridge positioned in said container and around the end of said first mentioned conduit, and spring pressed seal means extending between said clamping member and the center of the top of said filter cartridge.

7. An oil filter comprising a relatively light gauge container member, a reinforcing member secured to the upper edge of said container member, a cover member, screw means extending through said cover member, a clamping member having a screw connection with said screw means and engageable with said reinforcing member to clamp said cover member to said container, a bracket secured to the bottom of said container member, an attaching flange on said bracket and defining a pair of ports, a boss formed on the bottom of said container member and defining a passage, an oil conduit extending from one of said ports and through said passage, a second oil conduit extending from the other of said ports and through a wall of said container, a renewable filter cartridge having perforated side walls and a perforated center tube connected by annular imperforate end walls positioned in said container with one end of said center tube seated on said boss, a closure member for the other end of said center tube, and spring means extending between said clamping member and said closure means to hold closure means and filter cartridge in place.

8. In a filter, the combination of a container cover provided with a bracket adapted for attachment to an engine block, the bracket having conduit openings therein, the cover having a partition providing an outlet chamber above the partition, conduit connections from said conduit openings to said cover, one of which opens to said outlet chamber and the other opening through the cover below the partition, a container provided with a reinforcing ring at its upper edge having a plurality of downwardly facing lugs, a spider removably positioned within the open end of said container and with which said lugs coact, said spider having a downwardly projecting internally threaded hub, a clamping screw carried by the cover threaded into said hub and provided with a passage opening into the spider hub and to the outlet chamber above said cover, said cover having a gasket coacting with the rim of the container, there being a gasket surrounding said screw between said partition and spider, and a removable filter cartridge comprising a central foraminate outlet tube communicating with the passage in said hub of said spider, and a spring positioned between the bottom of said container and said cartridge and adapted to yieldingly urge said cartridge upwardly against the hub of said spider.

9. In a filter, the combination of a container cover provided with a bracket adapted for attachment to an engine block, the bracket having conduit openings therein, the cover having a partition providing an outlet chamber above the partition, conduit connections from said conduit openings to said cover, one of which opens to said outlet chamber and the other opening through the cover below the partition, a container, a spider removably positioned within the open end of said container and with which said container is engageable, said spider having a downwardly projecting internally threaded hub, a clamping screw carried by the cover threaded into said hub and provided with a passage opening into the spider hub and to the outlet chamber above said cover, and a removable filter cartridge comprising a central foraminate outlet tube communicating with said hub of said spider.

10. In a filter, the combination of a container cover provided with an angle shaped bracket adapted for attachment to an engine block, said bracket having conduit openings in both arms thereof, the cover having an outlet chamber, a container, means carried by said cover and with which said container is detachably engageable, an outlet conduit connecting one pair of the said conduit openings in the arms of said bracket and extending to said outlet chamber, and an inlet conduit connecting the other pair of conduit openings in said bracket and opening through said cover above said container, and a removable filter cartridge mounted within said container and provided with an outlet communicating with said outlet chamber of said cover, said conduits each having at least one bend therein between the arms of said bracket.

JAMES W. WILKINSON.

REFERENCES CITED

The following references are of record in the file of this patent:

UNITED STATES PATENTS

| Number | Name | Date |
|---|---|---|
| 1,071,585 | Rossell | Aug. 26, 1913 |
| 1,258,166 | Vollmann | Mar. 5, 1918 |
| 1,761,924 | Kamrath | June 3, 1930 |
| 2,059,358 | Johnson et al. | Nov. 3, 1936 |
| 2,230,241 | Franklin | Feb. 4, 1941 |
| 2,253,685 | Burckhalter | Aug. 26, 1941 |
| 2,277,737 | Wilkinson | Mar. 31, 1942 |
| 2,291,811 | Johnson | Aug. 4, 1942 |
| 2,333,890 | Russell | Nov. 9, 1943 |
| 2,354,238 | Wilkinson | July 25, 1944 |
| 2,357,572 | Baldwin | Sept. 5, 1944 |
| 2,381,141 | Russell | Aug. 7, 1945 |
| 2,418,777 | LeClair | Apr. 8, 1947 |